May 5, 1931.  F. S. WOIDICH  1,803,581
APPARATUS FOR THE STABILIZATION, RECTIFICATION, AND
FRACTIONAL DISTILLATION OF NATURAL GASOLINE
Filed Nov. 6, 1924
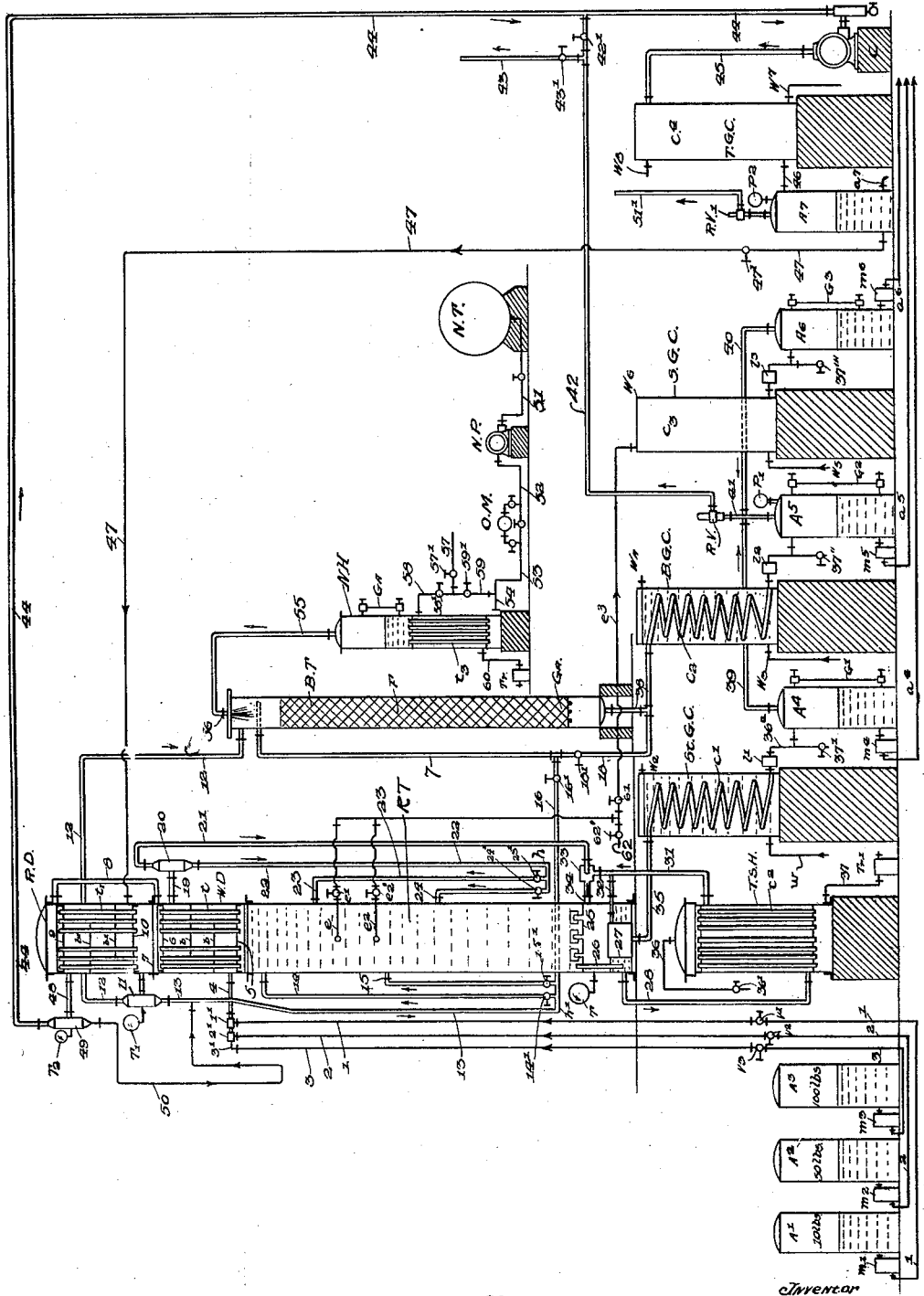

Patented May 5, 1931

1,803,581

UNITED STATES PATENT OFFICE

FRANCIS SALES WOIDICH, OF SAPULPA, OKLAHOMA

APPARATUS FOR THE STABILIZATION, RECTIFICATION, AND FRACTIONAL DISTILLATION OF NATURAL GASOLINE

Application filed November 6, 1924. Serial No. 748,161.

The invention relates to the extraction of the various group constituents of natural gasolines in commercial products by means of fractional distillation and rectification, although it is also applicable to similar hydrocarbon mixtures, as for example straight run gasolines, derived through the distillation of crude oil, etc., and has for its object to provide a simple process whereby this may be efficiently accomplished.

The improvement further contemplates the provision of a simple apparatus whereby said process may be efficiently carried out.

Other objects of my invention will appear from the description, and the features of novelty will be pointed out in the appended claims.

In the accompanying drawing, I have shown an example of my improved apparatus, in diagrammatic form, for illustrative and descriptive purposes, and similarly for illustrative and descriptive purposes the description will be directed to a natural gasoline mixture. The components are hydrocarbons, which may be extracted by various means and processes from natural gas or casinghead gas, for instance by the compression and cooling process, the refrigeration process, the oil-absorption process, the charcoal-absorption or by a combination of the above mentioned processes, or several of them.

It is an established and easily discernible fact that the natural gasolines manufactured and extracted from natural gas, casinghead gas from the head of an oil well, vapors and gases from storage tanks of crude or refined oils, gases and vapors from pipelines, still gases and vapors of oil refineries and cracking plants, etc., have different characteristics, depending upon the nature of the gas and vapors from which it was extracted, and that these characteristics are furthermore influenced and changed by the process or combination of processes used for the extraction of natural gasolines from these gases and vapors, etc., depending on the degree of efficiency of the extraction of natural gasoline from these gases and their final separation.

Natural gasolines produced by the compression process contain considerable amounts of hydrocarbons which are at atmospheric pressure and temperature in a gaseous state, as butane, propane, ethane, and even methane, which are kept in solution as long as the necessary pressure is exerted upon the liquefied gasoline, and even after the pressure is reduced to a point approaching atmospheric pressure; a considerable amount is kept in solution by intermolecular attraction.

These gaseous hydrocarbon constituents render the natural gasolines highly unstable and cause great losses in handling and shipping and renders gasolines because of their wild nature commercially and technically unfit for many of their uses.

At the slightest increase in temperature or even through shaking, these gaseous hydrocarbons emerge from the liquid gasoline and entrain with them, according to the laws of evaporation a complex mixture of intersoluble constituents, and take with them the higher boiling and more stable constituents, depending on the percentages present and the respective vapor tensions exerted at that particular temperature and pressure.

The present day methods used in purging the natural gasolines from these gaseous constituents (propane and butane) are either the atmospheric weathering method, or the steam treating method. In the first method the natural gasoline is stored in tanks with comparatively large evaporating surfaces under reduced pressure and is subjected to temperature changes of the atmosphere. This method is used in the warmer seasons, whereas in the winter time the steam treating method is resorted to.

These methods are of course crude and wasteful and never obtain the desired end completely of rendering the natural gasoline a safe product to handle and avoiding the subsequent handling and shipping losses.

This "tailgas" driven out by the above methods is usually recycled through the primary process of manufacture and in this manner a continuous vicious cycle is established, in which these valuable gases are wasted and subsequent losses of natural gasoline are the result.

The tailgas composed mostly of propane and butane is, however, a very valuable gas, because of its high calorific and illuminating value, and should be extracted and recovered in a concentrated form for industrial and domestic purposes in line with the policy of this country for conservation of its natural resources.

To evaluate this gas, we consider comparison with methane or natural gas, viz;

Methane has an average heating value of 1000 B. t. u. and an illuminating value of 5 British candle powers (B. C. P.), whereas propane has 2650 B. t. u. and 35 B. C. P., and butane a heating value of 3450 B. t. u. and an illuminating power of 54 B. C. P.

It is obvious from this comparison that this gas should be economically extracted from the natural gas with the natural gasoline in its entirety and then separated from the natural gasoline and liquefied and stored in high pressure steel bottles for the use of the welding industry and for domestic purposes, and thus be made a valuable source of income for the gasoline industry.

In my process I shall describe a method of extraction of this gas from the natural gasoline, concomitant with the process of stabilizing these gasolines and manufacturing special gasoline at the same time through fractional rectification.

Commercial cymogene is mainly butane which boils at a temperature of 34 degrees F. and exerts a pressure of 15 lbs. vapor tension.

Despite this low temperature and high vapor tension, natural gasoline can hold safely a considerable amount of butane, without undue losses, particularly so if the propanes have been removed, and by a process of substitution butane has taken the place of the propanes.

But there is nevertheless a surplus of butane which certain natural gasoline cannot hold safely beyond the law of intermolecular saturation, and it is this butane which we have to consider for conservation, either through a method of blending to be explained later, or by recovery in liquid form, as cymogene, etc.

The temperature of the saturated vapor of propane is −49 degrees F., exerting a tension of 15 pounds and the vapors of propane would exert a vapor tension of 75 lbs. at 32 degrees F. at 60° Fahrenheit or 15.5° C., the pressure required to condense butane from its saturated vapors is 2 atmospheres or 30 pounds. To condense propane at 60° F. a pressure of 112.5 pounds is required.

Natural gasolines comprise a series of hydrocarbons of various percentages according to the source of the gases from which they were extracted.

In order to describe the process in question, a typical gasoline plant is assumed, which uses a combination compression and absorption process for the extraction of natural gasoline from the natural gas.

The gas is at first subjected to a pressure of 45 to 50 lbs. and subsequently cooled to about 60 degrees F. in order to remove the heat of compression and to liquefy those constituents of natural gas which will have at the pressure and this temperature their dew point of condensation.

The gasoline so obtained will consist of the highest boiling point hydrocarbons as decane (334 degrees F.), nonane (298 degrees F.), octane (257 degrees F.), heptane (208 degrees F.), and a small percentage of hexanes (158 degrees F.) and pentanes (100 degrees F.). The percentage of recovery of the total gasoline yield from that gas may be assumed to be 20%. This gasoline contains various amounts of dissolved butane, propane, and even natural gas, but will appear less wild, when exposed to atmospheric temperature and pressure, due to the greater intermolecular attraction exerted by the higher boiling and molecularly more complex hydrocarbons.

The cooled gas, deprived of its heaviest fraction of natural gasoline, now proceeds to the absorbing towers, where it will be deprived of its remaining part of natural gasoline, through the medium of oil absorption, the absorbing oil being deprived of its gasoline content through steam distillation, whereupon it resumes its cycle of absorption after proper cooling of the oil.

The absorption process is carried out under the same pressure of 50 lbs. This compression and absorption tends to remove the highest and least volatile hydrocarbon from gas leaving the lowest boiling and most volatile in the gas.

The steam distillation of the absorbing oil should now yield the remaining part of the total natural gasoline yield, that is, 80%. The fact, however, is that the steam distillation yields only additional 20 to 25% of the total yield, whereas the remainder of the gasoline recovered will evaporate and go off as still-tail-gas when exposed to near atmospheric pressure and temperature.

Since this tailgas carries off valuable higher boiling point hydrocarbons from the residue gasoline, which would be lost, it is therefore subjected to a pressure of from 75 to 100 lbs. and subsequently cooled, and by this third cycle of manufacture the remainder of the total gasoline yield is obtained, amounting to from 55 to 60% of the total yield.

This last gasoline contains as boiling points at atmospheric pressure mostly pentane (100 degrees F.), butane (34 degrees F.), and a considerable part of intersolved propane (—49 degrees F.), and ethane, etc., which latter gaseous constituents render all of the recovered gasoline, when finally mixed, highly unstable, and unfit for most industrial purposes, and entail danger in handling and shipping, not to speak of the losses of handling, when it once has left the premises of the plant; because as long as it is on the premises of the plant, recycling of the tailgases and vapors in the last named cycle of manufacture can take place, as I have already mentioned.

Now, I can proceed with the description of the process and apparatus of my application which will remove the above obstacles, losses and danger, and will either manufacture a natural gasoline as stable as any gasoline produced by the distillation of crude oil, which can be safely handled and stored and shipped under atmospheric pressure without undue loss or any special gasoline of any specification as to recovery and boiling point can be manufactured in a continuous and concomitant cycle with the primary cycle of manufacture, and the valuable foreshots, such as propane and butane be recovered in liquid form as a commercial product, instead of being wasted and being a continuous source of loss and trouble.

In the accompanying drawing A1, A2, and A3 are the receiving receptacles or accumulators of the various gasoline products as recovered under the before mentioned processes of extraction by compression, absorption and recompression of the residue tail gases from the steam still.

A2 receives the gasoline from the compression process at 50 lbs. pressure. A1 receives the gasoline from the steam still under approximately 10 lbs. pressure, and A3 receives the gasoline from the recompressor at approximately 100 lbs. pressure.

As fast as these gasolines fall on from the respective cycles of manufacture, they are at once removed through the automatic motor valves m1, m2 and m3, and pipe lines 1, 2, and 3 over control valves v1, v2, v3 to a mixing header 1', 2', 3', and 4 to the bottom of the weathering dephlegmator or evaporator WD.

The mixing header 1', 2', 3', 4 is based on the injector principle to insure thorough and intimate mixing of the various gasolines.

The gasoline with the highest pressure of 100 lbs. in A3 exerts by its expansion through the release by m3 a sucking action on pipeline 2 at 2', lifting the gasoline released through m2 from A2 under 50 lbs. pressure and increases the expansion capacity of the latter gas line, thereby mixing thoroughly between 2' and 1'. The combined expansion of gasoline from A3 and A2 exerts again a suction on pipeline 1, lifting the gasoline released through m1 from A1, increasing thereby its expansion, and thorough and intimate mixing is finally effected of all three gasolines in pipe 4, leading to the bottom of dephlegmator WD.

The weathering dephlegmator is built like a tubular condenser as shown, consisting of a shell, two tubular plates 5 and 6 in which tubes $t$ are rolled and expanded. Baffle plates $b$ intersect the space between the shell and the tubes to compel the fluid to flow around the tubes to a circuitous route, insuring rapid circulation and intimate contact between the cooling medium around the tubes and the heating medium inside of the tubes.

In the following description the operation of the process and apparatus for the stabilization of natural gasoline proper will be pointed out; that is, the natural gasoline as a whole will be simply deprived of the gaseous constituents and the natural gasoline as a whole will be extracted with all its constitutents inherent to natural gasoline, which will be termed stabilized gasoline. To be more specific, we might term a gasoline as a stabilized gasoline, which yields with the standard A. P. I. distillation test a recovery of 98%, regardless of the gravity of the gasoline, whereas unstabilized natural gasoline has a recovery yield of from 90% to 95% only.

When the natural gasoline stored in A1, A2, A3 under the respective pressure of manufacture are released to near atmospheric pressure, an expansion will take place as above mentioned, and a cooling effect will be established by the expanding liquid and gases, and this cooling effect is made use of, to produce the necessary dephlegmating reflux condensation from the rising gasoline vapors and gases from the rectifying column or tower RT, to perform the function of fractional distillation and rectification of the complex natural gasoline hydrocarbon mixture, which it is proposed to free of its most volatile and gaseous constituents.

The action of refrigeration is carried out in parallel current, that is the hottest vapors passing inside the tubular flues ($t$) upwards in the weathering dephlegmator (WD) are subjected to a sudden chilling action by the expanded natural gasoline and gases, entering at the bottom of WD and circulating around and outside of the tubular flues ($t$) and around the baffles ($b$) rise in parallel current with the hot vapors inside of the flues ($t$).

It is this sudden chilling effect on the hot rising vapors inside of the tubes which produces a successful check on the vaporizable constituents of gasoline thus insuring intimacy of contact between condensable and the uncondensable gaseous constituents, which pass on upwards.

The expanded natural gasolines, while passing around the flues in dephlegmator WD, will absorb heat from the hot vapors rising in the flues and will be subjected to evaporation, driving out of the liquid gasoline all gaseous constituents as butanes, propanes, etc., which will, of course, carry with them proportional parts of vapors of the higher boiling hydrocarbons according to the percentages present and their vapor tension exerted at that temperature and pressure under which the vaporation was carried out.

The vaporized gasoline, gaseous constituents and liquid gasoline leave the dephlegmator WD at the top through connection 19 and enter into a separator 20, where the gaseous constituents and vapors are separated from the liquid gasoline.

The gases and vapors leave at the top of separator 20 through pipeline 21 and being a complex mixture of gases and valuable gasoline hydrocarbons, are now to be subjected to rectification in tower RT which may be of any suitable construction, though a rectifier of the contact type is preferred, intersected in various places by selective sealplates, insuring maximum deflection and contact between the vapor and liquid phase rectifying media.

The gases and vapors are thus conducted to the base of tower RT through pipe 21, but before entering the base of tower RT, they pass through a mixing head 33, built after the injector type, the purpose of which is to first heat these relatively cool vapors and gases before they enter the tower, and the second purpose is to thoroughly mix these gases and vapors with the rectifying vapors coming from the thermo-siphon-heater TSH through line 31.

The gases and vapors coming through pipe 21 will exert an injector effect in mixing head 33, sucking off the hot vapors through line 31 from the heater TSH, and will be thoroughly co-mingled in pipe 34 leading to the base of tower RT, passing upwards through the tower to be subjected to progressive rectifying action in counterflow to the rectifying reflux from the dephlegmator and evaporator WD and the liquid natural gasoline feed provided by separator 20 and pipelines 22 and 23, controlled by valve 23′.

The liquid gasoline leaving separator 20 at the bottom through pipe 22 is brought down to a convenient height from the service floor and connected to a header $h$ whence the gasoline can be conducted through lines 23 and 24 and controlled by valves 23′ and 24′ to different levels of the rectifying tower.

The exact location of this gasoline feed is determined by the nature of the gasoline to be stabilized or rectified and can be calculated from the percentage composition of same and the factor of concentration.

The feed through line 23 will be considered at the present time only for the desired stabilization of the total gasoline output.

The gasoline from line 23 finely distributed over the cross-section of the tower or fed on a selective rectifying plate flows down over the tower in counterflow with the rectifying vaporphase medium rising from the tower base and will be subjected to rectification through progressive evaporation and fractional condensation of both media, establishing balanced rectifying levels of liquid and vapor phase, all lighter or volatile constituents establishing their levels towards the top of the rectifier and all heavier or less volatile constituents seeking their respective levels towards the bottom of the tower.

The gasoline thus flowing down over the tower will be progressively deprived of its gaseous constituents and most volatile hydrocarbons, whereas the uprising vapors and weathered gases from dephlegmator WD will be deprived from level to level of tower RT of its less volatile or heavier constituents until they enter the dephlegmator WD to be subjected to refrigeration, dropping again the less volatile constituents by condensation, which will resume its downward rectifying cycle.

The gasoline having reached on its downward way over the tower the last plate 25 of a selective type is drained from the seal of that plate through pipe 26 to the base of the tower where a circular liquid seal is established between the tower shell and a cylindrical extraction receiver 27, pipe 26 being sealed against passage of vapors into this seal.

From this seal the gasoline siphons down through line 28 to the bottom of the thermo-siphon-heater TSH consisting as shown of a shell with two tubular flueplates in which the heating tubes $t2$ are expanded and the space between the shell and the flues being so constructed as to compel the gasoline to be heated in a circuitous route.

In this heater the gasoline will be subjected to steam heating, causing part of the gasoline to evaporate. This is done through live steam, admitted to the top of the heater through control valve 36′ and line 36, passing inside of the tubes of the heater in counterflow to the gasoline circulating outside of the heating tubes.

The evaporation of part of the gasoline in TSH will set up a rapid circulation of gasoline from the tower base through the heater and back to the tower base, due to the thermo-siphonic principle involved and on account of the injector effect established in the mixing head 33 as already mentioned.

Here a thorough treatment is imparted to the gasoline before it is extracted as stabilized gasoline, because in the rapid circulation during the heating treatment, all intersolved gases are finally driven out and join their way with the gasoline vapors upwards through the tower. The gasoline freed of all gaseous constituents, however, is siphoned back into the extracting receptacle 27 through connection 32, from where it will flow as a finished product through line 35 to the stabilized gasoline cooler St GC, where it will be cooled by flowing inside of coil C1 in counter flow to the cooling water, entering through w1 and leaving through w2, whereas the gasoline will leave through sight box 1₁, line 36a to receiver or accumulator A4, and through motor valve m4 and line a4 to be transferred to the storage tank.

The action of the thermo-siphon-heater and its lifting power from a lower level to a higher level of the liquid involved, is based on parallel current circulation of liquid and its heat generated vapors, the bouyancy of the latter inducing a rapid circulation, due to expansion from liquid to vapor-phase and causing also the evaporation of lower boiling fractions, though the temperature has not reached the temperature of evaporation of these constituents.

These evaporators are therefore exceedingly sensitive, quick in action and capable of overload and very economic. This evaporator is a very important part of the rectifier, due to its gas-expelling, eliminating and separating action, i. e., that no gas can actually stay in the gasoline after it has passed the evaporator, and the gasoline lifted back to receiver 27 is therefore free of all intermolecular dissolved gases, in contra-distinction to rectifiers using heaters of the common type, as a coil in a still, or tubular heater on counter-current principles. The gasoline leaving RT, through 28 enters the bottom of the heater and rising around the tubes in counter current to steam from 36, it is heated and partially evaporated, setting up a rapid circulation of vapors and entrained gasoline, the latter of which is lifted with the rising vapors and gases in 31, and is discharged through line 32 into receiver 27, whereas the vapors and gases are sucked off in 33 by the first gas-phase of WD, and enters RT through 34. At the point where line 32 branches off line 31, a liquid separator is provided, which is not shown, being only a diagrammatic sketch, to effect a clean separation of vapors and gases from the residual liquid, that is the rectified gasoline. The siphonic action to lift the gasoline back to the tower base is caused through the above buoyancy of generated vapors in parallel cycle, and the primary cause of this lift is, of course, due to heating, therefor, the name: thermo-siphon-heater.

Control valve 36' for live steam is controlled by thermostat T at the towerbase, always insuring uniform temperature conditions. The temperature requirements for stabilizing gasoline proper are very low if the tower is properly designed and minimum of reflux is required.

Now we resume the way of the gaseous constituents which have passed the tower RT and have been subjected to the first chilling action in WD, depriving the emerging gases and vapors of its heavy constituents, which resume the cycle of reflux down over the tower. The gases and remaining vapors thus leaving the tubes t in dephlegmator WD are now leaving at the top through pipe 8 and enter the top of refrigerating dephlegmator RD, downwards through the flues t1 in counterflow to the refrigerating medium entering through line 47 at the base of RD and circulating around the tubular flues and the circulating baffles b1. Here as we will point out later on, an intensified cooling action is effected on the gases and vapors and the remainder of condensable hydrocarbon constituents will have been liquefied, which will collect on the bottom of the dephlegmator plate 7 and finally leave with the gases at the bottom dephlegmator RD and enter the separator 11, where the gaseous constituents are separated from the liquid, the first leaving through line 12 and the latter through line 13, which leads to a header h1, where the condensed liquid can be distributed through lines 14, 15, 16, 17, and 18, according to the requirements, controlled by the valves 14', 15', 16', and 18'.

In my present case, referring to stabilization proper, the condensate is discharged through line 14 into the top of the tower RT to perform here its function of rectifying reflux over the tower, that is for maximum concentration.

The remnant gases leaving separator 11 through line 12 consist mostly of propane and butane with traces of ethane and methane. Provided that the substitution of the propanes for the butanes in the natural gasoline could have been effected in the rectifying tower to the point of molecular or rather intermolecular saturation and if no surplus of butane is available beyond that point, the gases in question will mostly consist of propane and small percentages of ethane and methane.

But actual experience and practice shows that butanes always exceed in quantity the point of intermolecular saturation and an excess of butane is available for eventual further recovery which may be effected through hot blending with a refined naphtha either in liquid or vapor form.

To effect this recovery a small blending tower BT is provided through which the remnant gases from the stabilization process pass from line 12, entering at the top of the tower and pass in parallel flow with hot naphtha vapors or with hot finely atomized liquid naphtha through a proper contact material (F), filling the tower BT and leaving the bottom of the tower through line 38 to blended gasoline cooler BGC, where gases and naphtha will be cooled in coil $c2$, pass through sight box $1_2$ to accumulator A5 for blended gasoline, where it will be released through motor valve $m5$ and line $a5$ to the storage tank.

The remnant gas, consisting mainly of propane, will accumulate and settle out at the top of accumulator A5, where it will be retained to set up a small counter pressure in the stabilizing system and the surplus of gas will find exit through the relief valve RV and be conducted through line 42 over a storage tank, not shown, to the suction end of compressor C through line 44.

Here these remnant gases will be subjected to pressure of liquefaction, ranging approximately from 400 to 450 lbs., depending on the composition of the gas as pointed out on pages 3 and 4 of this description.

The compressed gas leaves the compressor through line 45 and passes through water cooling coil C4 of tailgas-cooler TGC and leaves the cooler through 46 to accumulator A7 where the liquefied propane, or propane and butane of my later description will be stored. The remnant gases left as ethane and methane will be retained to set up the required pressure on gauge P2 and the excess of these gases will find exit through relief valve RV1 and line 51′, being returned to the natural gas supply of the plant.

When enough liquid propane, or propane and butane has been accumulated in accumulator A7, the refrigeration cycle for the refrigeration dephlegmator RD is set in operation.

Expansion valve 47′ is carefully cracked and exit is given to the liquid propane, leaving through line 47 and entering at the bottom of dephlegmator RD and expanding from about 400 lbs. pressure to the pressure established in the stabilizing system and controlled by pressure gauge P1 on accumulator A5, thereby causing an intense action of refrigeration around the tubular flues $t1$ of dephlegmator RD and absorbing the heat from the hot gases inside the flues, evaporation of the butane-propane liquid will set in, as far as the liquid has not already vaporized through the expansion.

The gases leave the dephlegmator through pipe 48 into separator 49, where, eventually, escaped heavier hydrocarbons, as butane and pentane may be re-cycled in liquid form back to the stabilizing system, leaving separator 49 at the bottom through line 50 and feeding over a siphon seal to reflux line 13 and through line 14 back into tower RT.

The expanded gases leave separator 49 at the top through line 44, resuming their cycle back to the suction line of the compressor C to be here reliquefied and to resume its cooling cycle anew through expansion valve 47′ and line 47 to dephlegmator RD.

The quantity of liquid propane or propane and butane, as the mode of manufacture may require, to be kept in the refrigerating cycle to effect the required cooling effect in dephlegmator RD can be determined and controlled either through an orifice meter ahead of expansion valve 47′ or by an automatic control through the interaction of thermostat T2 in separator 49, or T1 in separator 11 and the expansion valve 47′ proper.

In the course of continued operation of the process an excess amount of liquefied propane and butane will be produced over the cycle requirements for refrigeration, which excess can be withdrawn from the accumulator through line $a7$ to a pressure storage, where the liquefied gases can be withdrawn in steel bottles and sold for industrial welding purposes or for domestic heating and illumination, etc.

In describing the stabilization of natural gasoline proper, we have seen that three products have been produced: (1) stabilized gasoline from the bottom of tower RT; (2) blended gasoline, and (3) liquid propane, or propane and butane, as commercial cymogene.

Going back to the manufacture of blended gasoline by means of a refined naphtha from the distillation of crude oil, we have pointed out that the excess butane over the point of intermolecular saturation of natural gasoline may be recovered in blending tower BT. However, the blending of butane with naphtha would not render a satisfactory motor gasoline due to the gap of missing hydrocarbon series between the butane and the next lowest boiling hydrocarbon of the naphtha, which would be heptane and octane.

To fill this gap and have a satisfactorily blended gasoline an adequate proportion of pentanes and hexane has to be provided in the cycle of this blending operation.

Looking at the drawing we see line 16 branching off from header $h1$ for the distribution of the reflux of dephlegmator RD through line 13 and over line 14 and control valve 14′ to the top of tower RT. If valve 16′ is opened in line 16, we see that a part of this reflux can be withdrawn through line 17 to the top of blending tower BT; or if valve 18′ is opened in line 18, an adequate amount of reflux can be withdrawn directly in the cooling coil C2 and thus the missing hydrocarbons can be added through the proper conduct of operation of dephlegmators WD and RD.

The hot blending can be carried out as vapor blending, or as hot blending in liquid phase. In the drawing, is shown vapor-phase blending of naphtha. Naphtha blending pump NP takes naphtha from storage tank NT through line 51 and discharges the naphtha to line 52 over an oil meter OM through lines 53 and 54 in the bottom of naphtha heater NH. The naphtha passes through heating tubes $t3$ upwards in counterflow to the heating medium, steam, outside of the flues, supplied by line 58, control valve 58', valve 57', and line 57. A jet of direct steam may be supplied through control valve 59' and line 59 to the naphtha feed line 54, if necessary.

The water of condensation from the heater NH is withdrawn through 60 and water trap TR to be returned to the boilers. The same pertains to the thermo-siphon-heater TSH, where the water of condensation is withdrawn through line 37 and steam trap $Tr1$ and returned to the boilers.

37', 37'', 37''' are sample cocks for the inspection of the products run.

Having described the operation of stabilization of natural gasoline proper, that is to remove from the natural gasoline complex all gaseous constituents and have two distinct products, namely, stabilized gasoline and liquefied propane and butane, the blending operation being here of minor importance, due to the dryness of the remnant gases, we now proceed and describe its second operation, where the natural gasoline complex may be subdivided in any desirable cuts or fractions of special specification, such as solvent gasolines for the rubber industry, special gasolines for the varnish industry or dry cleaning, etc., where the initial boiling point of these gasolines and their endpoint lay close together and covering a boiling point range which may be those of the lighter constituents or those of the heart fractions, or those of the tail fractions.

Here the blending operation will be of great importance to make use of all lighter constituents by binding them to refined naphtha and produce a uniform and stable motor gasoline, which will have the same characteristics as a good straight run gasoline, and then to have a tailgas which will be richer in butane and therefore produce a product termed commercially as cymogen.

The operation of fractional distillation of natural gasoline in this instance will be carried out at higher temperatures at thermometers T at the towerbase and T1 at the tower top, therefore more lighter constituents as butane, pentane, and hexane will leave the tower top and be subjected to hot naphtha blending, resulting in a stable motor gasoline.

The gasoline extracted at the tower base will therefore contain less volatile constituents and be almost as stable as an average refined gasoline with a distillation recovery of the same order.

This gasoline will be the best aviation gasoline imaginable.

The operation will be as follows:

The natural gasolines as recovered by the various processes in the accumulators A1, A2, A3 will be fed as fast as they are manufactured in the before-described way through lines 1, 2, 3 to the dephlegmator WD and here be subjected to evaporation or weathering, exerting at the same time a refrigeration effect on the vapor-gas mixture emerging from the top of the rectifier and produced through the thermo-siphon-heater TSH at the base of the tower RT.

The weathered gases and vapors of the natural gasoline complex are entering the tower base of RT through line 21 from separator 20, over the mixing head 33 and connection 34, properly preheated and mixed with the rectifying vapors emerging from heater TSH through line 31.

The heated vapors and gases rising through tower RT upwards in counter flow to the reflux from WD and RD and the gasoline feed from line 22 over valve 23' and line 23, will cause from plate to plate or level to level fractional distillation of reflux and gasoline feed and be in return subjected to progressive fractional condensation, establishing balanced conditions between vapor and liquid phase, displacing the remainder of intersolved gases from level to level and depriving the gases and vapors as they proceed through the various rectifying levels and plates of the respective heavier hydrocarbon constituents and effecting the substitution of propane for butane in the liquid phase of the downflowing gasoline, etc., to the point of intermolecular saturation.

The gasoline feed will now be changed from line 23 to line 24, controlled by valve 24', that is close to the tower base. The reason for this change is to effect in the tower above feed line 24 concentration of the various hydrocarbons through interaction between the vapors and reflux alone and to establish on the various selective plates the concentration of hydrocarbons with close boiling points, from where they can be extracted continuously according to the specifications desired as shown by extracting lines $e$ and $e2$, controlled by valves $e'$ and $e2'$, either single or combined, or in any other multiple form or their combinations, and are extracted through a header over valve 61 and line $e3$ to special gasoline cooler SGC passing through coil C3 in counterflow to cooling water from $w5$, over look-box $1_3$ to accumulator A6 and from here over $m6$ and $a6$ to the storage tank.

The reason for the change of level from 23 to 24 is, that the feed of unstabilized gasoline must be below the two extraction lines $e$ and $e2$ with valves $e1$ and $e2'$, because otherwise unstable gasoline would be extracted through these intermediary extracting lines, when those are in operation.

Accumulator A6 is vented by line 40 to accumulator A5 for the equalization of the pressure under which the operation is carried out, which will be almost atmospheric pressure at this mode of operation.

Equally accumulator A4 is vented for the same reason through line 39 to accumulator A5.

The extracting lines $e$, $e2$, etc., with their valves $e'$, $e2'$, etc., can be brought down to the service floor for easy handling by the operator and small test coolers will be provided where the gasolines to be extracted can be inspected and tested, after balanced conditions are established in the tower RT.

According to the level or selective plate where the gasolines are withdrawn, the quality of the gasoline will always be the same and their combinations will render any gasoline desired of any specification, without changing the mode of operation of the process or tower. These gasoline fractions can embrace the lighter hydrocarbons at the top of the tower, or the heart fractions as shown by $e1$ and $e2$ and any combinations thereof.

Without any additional operation expenses for labor or fuel, etc., these special gasolines can be manufactured at a moment's notice and to satisfy the demands of any special markets and reap the benefit of the concomitant better and higher prices.

It is well understood that the extraction of this gasoline from the various selective plates is only partial without interfering with the operation of the tower RT in those parts which lay below these selective plates.

The gasoline extracted from the tower base through line 35 from extraction receiver 27 will embrace the most stable gasoline hydrocarbons and contain the lightest constituents only in small fractions rendering a splendid gasoline as solvents for the rubber industry, etc., or making a No. 1 aviation gasoline.

If this gasoline should need any adjustment as to its initial boiling point or to straighten out the characteristics of its boiling point curve, this can be easily done by supplying any of the desired constituents through feed valve 62' and feed line 62, which is the line branching off of 35 with valve 62' joining into the header with the line $e3$ and valve 61.

The vapors and gases emerging from dephlegmator WD after being subjected to the first refrigeration through the expansion of the natural gasoline feed 1, 2, 3, leave through line 8 and pass in counter current flow the tubes $t1$ of final refrigerator and dephlegmator RD to yield in this refrigeration the second supply of rectifying reflux, rendering the remaining gases more or less dry, according to desire, depending on the temperature maintained at the exit of this dephlegmator at thermometer T1 in separator 11.

Due to the desired higher concentration of the gasoline hydrocarbons in the upper part of the tower RT, maximum refrigeration and maximum reflux will be required to accomplish that end, which means that a greater amount of liquefied propane and butane in A7 will be kept in the refrigeration cycle.

But inasmuch as I want to produce a blended motor gasoline through naphtha blending I am able to allow the passage of the required butane, pentane and hexane hydrocarbons and recover same in blending tower BT, or supply these constituents through feed line 16 or 18 from the reflux header $h1$, or if I desire, I can recover them in the refrigerating dephlegmator RD and at disposition for the maximum concentration in the rectifier.

The gases and vapors leave separator 11 through line 12 and are subjected here to the removal of all valuable gasoline constituents through hot blending with naphtha as before described, being extracted through 38 and cooled in BGC by water through $w3$ and accumulated in A5 as finished product.

The remnant gases composed of propane and butane leave the accumulator A5 through 41 and relief valve RV and pass through 42 and 42' to the suction line 44 of compresser C, where they will be liquefied by pressure and water cooling, stored in accumulator A7 and resume here the refrigerating cycle through the dephlegmator RD and return from separator 49 through line 44 to the compressor, whereas the eventual liquid part of the condensation, consisting of higher boiling hydrocarbons, may be returned through line 50 to the reflux produced in RD and extracted through line 13 to be returned to the tower RT through line 15 controlled by valve 15', instead of through line 14 as previously described.

The reason for this is the same as previously pointed out for the gasoline feed, only the feed of the reflux will be carried as close as possible to the predetermined selective plate of extraction, see drawing.

In this description only general principles can be considered in regard to the location of these selective extraction plates of the tower RT and in regard to the location of the feed lines for gasoline and the respective primary or secondary refluxes, because they depend on the raw material to be rectified and the products to be extracted, and it is an easy matter to subject the proper construction of a tower of this sort, serving certain conditions, to the necessary mathematical calculations with regard to desired concentration and the physical analysis of the constituents present in the raw material and thereby making proper provisions for the practical deviations as far as they enter into the operation of such a process.

Resuming the conclusions of the results of operation of this process of fractional distillation and stabilization, we see that the gasoline complex as a raw material with gaseous constituents intersolved, which render it unstable and unfit for many purposes and causing great losses in handling, etc., can be subdivided by this process in group-constituents of any desired combination or specification and that all products contained in the raw natural gasoline can be made available and be recovered for certain purposes and uses.

I have subdivided this complex natural raw gasoline first in the foreshots, the remnant gases, propane and butane, in liquefied form as a by-product of this process, available for many uses, particularly industrial welding, which is an important feature in the oil fields; second, a blended motor gasoline which solves the problem of economically disposing and making use of the excess amount of butanes which are present in all raw gasolines beyond the point of intermolecular saturation; third, in the extraction of any gasoline of a certain specification for certain industries, the manufacture of which entails difficult problems if their manufacture is detached and separate from the manufacture of raw casinghead or natural gasoline, because of the necessity of special equipment as compressors, etc., and the power requirements for cheap and efficient extraction, which requirements are, however, the rule in any gasoline plant and do not require any material extra outlay of money; fourth, in a stable residue gasoline, which can be used as a special gasoline for many purposes as solvents, etc., or as an aviation fuel gasoline, commanding the highest prices.

This, however, is not all in my consideration of the economic importance of such a process and apparatus as far as its stabilized and refined products are concerned and their disposal without undue losses and avoiding the factors of danger.

The most important feature relates to the possibility of stripping the gases from which the natural gasolines are extracted of its total amount of valuable gasoline hydrocarbons, which in the majority of all gasoline plants could not be accomplished, because of concomitant increased recovery of gaseous hydrocarbons as propanes and butanes, which had to be continuously recycled, without getting rid of them in a dry state and without loss of the recovered gasoline constituents.

Most of the manufacturers of natural gasoline abstained from recovering all available natural gasoline from the gas, because of the difficulties of the concomitant increased yield of this propane and butane gases and as a matter of fact, their losses rather increased and decreased their valuable yields in natural gasoline.

The installation, however, of a stabilizing and rectifying tower will make possible the maximum extraction of natural gasoline from gas, as also the propane and butane hydrocarbons will now be valuable products and will be disposed of and extracted as fast as they are produced for the benefit of the plant owners, as well as for the country, which has all reason to be deeply concerned with the conservation of the natural resources.

From this point of view, it is believed, that the average yield of extractable natural gasoline could be increased by at least 10%, exclusive of the extra yield in the valuable fuel hydrocarbons in a concentrated form.

I claim:

1. Apparatus of the character described, including a pressure storage system for natural gasolines, a thermo-siphon heater, a rectifying column above said heater, means for conducting fluids through said heater from and to the bottom of said column, a weathering dephlegmator fixed to the top of said column, means for conducting gasolines from the storage system into said dephlegmator to expand therein, said dephlegmator including a plurality of flues for conducting gases and vapors from said column.

2. Apparatus of the character described, including a system for storing natural gasolines at different pressures, a thermo-siphon heater, a rectifying column above said heater, a mixing head connected to said column near the base thereof, means including said mixing head connected to said column near the bottom thereof for conducting fluids through said heater from and to the bottom of said column, an expansion chamber closed to said column and connected to the top thereof; means for conducting gasolines from said system to the bottom of said chamber to mix and expand therein, flues extending through said chamber to conduct gases and vapors from said column to heat the expanded gasolines in said chamber, a separator connected to the top of said chamber, a pipe connecting the top of said separator to said mixing head, and valve controlled piping connecting the bottom of said separator to said column at different heights therein.

3. The apparatus set forth in claim 2 in combination with a refrigerating chamber mounted on the top of said expansion chamber, means for conducting gases and vapors from said flues, to the top of said refrigerating chamber, a separator connected to the bottom of said refrigerating chamber, a naphtha blending tower, a pipe connecting the top of said separator, to the top of said tower, means for heating and feeding a fluid to the top of said blending tower, a storage tank, and valve controlled fluid conducting and cooling means connecting the bottom of said blending tower to said storage tank.

4. The apparatus set forth in claim 2, in combination with a refrigerating chamber mounted on said expansion chamber, means for conducting gases and vapors from said flues to the top of said refrigerating chamber, a separator connected to the bottom of said refrigerating chamber, a storage tank apparatus including a heater and blending tower connecting the top of the last named separator to said storage tank, valve controlled piping connecting the bottom of the last named separator to said rectifying column at various heights therein and to the top of said tower.

5. The apparatus set forth in claim 2 in combination with a refrigerating chamber mounted on said expansion chamber, means for conducting gases and vapors from said flues to the top of said refrigerating chamber, a separator connected to the top of said refrigerating chamber, a storage tank, and means including a compressor for connecting the top of said separator to said storage tank.

6. The apparatus set forth in claim 2, in combination with a refrigerating chamber, mounted on said expansion chamber, means for conducting gases and vapors from said flues to said refrigerating chamber, a separator connected to the top of said refrigerating chamber, a storage tank, means including a compressor connecting the top of said separator to said tank, and a valve controlled line connecting said tank to said refrigerating chamber.

In testimony whereof I affix my signature.

FRANCIS S. WOIDICH.